US012570258B2

(12) United States Patent
Otremba et al.

(10) Patent No.: US 12,570,258 B2
(45) Date of Patent: Mar. 10, 2026

(54) FAIL-SAFE VALVE UNIT, ELECTRONICALLY CONTROLLABLE PNEUMATIC BRAKE SYSTEM, METHOD FOR OPERATING A BRAKE SYSTEM

(71) Applicant: ZF CV Systems Global GmbH, Bern (CH)

(72) Inventors: Robert Otremba, Ronnenberg (DE); Julian van Thiel, Grossburgwedel (DE)

(73) Assignee: ZF CV Systems Global GmbH, Bern (CH)

( * ) Notice: Subject to any disclaimer, the term of this patent is extended or adjusted under 35 U.S.C. 154(b) by 967 days.

(21) Appl. No.: 17/747,201

(22) Filed: May 18, 2022

(65) Prior Publication Data

US 2022/0274573 A1 Sep. 1, 2022

Related U.S. Application Data

(63) Continuation of application No. PCT/EP2020/082387, filed on Nov. 17, 2020.

(30) Foreign Application Priority Data

Nov. 18, 2019 (DE) ..................... 10 2019 131 112.8
Nov. 17, 2020 (DE) ..................... 10 2020 130 277.0

(51) Int. Cl.
*B60T 8/94* (2006.01)
*B60T 13/68* (2006.01)
(Continued)

(52) U.S. Cl.
CPC .............. *B60T 8/94* (2013.01); *B60T 13/683* (2013.01); *B60T 15/027* (2013.01);
(Continued)

(58) Field of Classification Search
CPC ..................................................... B60T 15/027
See application file for complete search history.

(56) References Cited

U.S. PATENT DOCUMENTS

| | | | |
|---|---|---|---|
| 2002/0124891 A1 | 9/2002 | Frank et al. | |
| 2017/0267221 A1 | 9/2017 | Hecker et al. | |

(Continued)

FOREIGN PATENT DOCUMENTS

| | | |
|---|---|---|
| CN | 107921945 A | 4/2018 |
| CN | 109789868 A | 5/2019 |

(Continued)

OTHER PUBLICATIONS

Translation and Written Opinion of the International Searching Authority dated Feb. 3, 2021 for international application PCT/EP2020/082387 on which this application is based.

(Continued)

*Primary Examiner* — Melody M Burch
(74) *Attorney, Agent, or Firm* — Walter Ottesen, P.A.

(57) ABSTRACT

A fail-safety valve unit is for a failure braking function of a pneumatic braking system for a vehicle. The fail-safety valve unit has a first and a second failure brake valve configured as monostable valves, and a main line which pneumatically connects a main port, which provides a first pressure, and a failure port. The first and second failure brake valves are connected pneumatically in series in the main line. The first and the second failure brake valves are controllable by different control units. The failure brake valves are open in an open position when not actuated such that the first pressure prevailing at the main port is provided as a failure brake pressure at the failure port such that, in a fault situation, in an electrical failure, and/or in a diagnostic situation, a failure braking operation is triggered via provision of the failure brake pressure at the failure port.

25 Claims, 4 Drawing Sheets

(51) Int. Cl.
　　　*B60T 15/02*　　　(2006.01)
　　　*B60T 13/26*　　　(2006.01)
(52) U.S. Cl.
　　　CPC ....... *B60T 13/268* (2013.01); *B60T 2270/402*
　　　　　　(2013.01); *B60T 2270/406* (2013.01); *B60T*
　　　　　*2270/413* (2013.01); *B60T 2270/414* (2013.01)

(56)　　　　　　References Cited

U.S. PATENT DOCUMENTS

| | | |
|---|---|---|
| 2019/0152459 A1 | 5/2019 | Dieckmann et al. |
| 2019/0193705 A1 | 6/2019 | Wulf |
| 2019/0248346 A1 | 8/2019 | Wulf |
| 2019/0248349 A1 | 8/2019 | Wulf |
| 2019/0248350 A1 | 8/2019 | Wulf |
| 2019/0248351 A1 | 8/2019 | Wulf |
| 2019/0337503 A1 | 11/2019 | Otremba |
| 2020/0023820 A1 | 1/2020 | Van Thiel |
| 2020/0023827 A1 | 1/2020 | Van Thiel |
| 2020/0070795 A1 | 3/2020 | Van Thiel |
| 2020/0148180 A1 | 5/2020 | Van Thiel |
| 2020/0406879 A1 | 12/2020 | Hecker et al. |

FOREIGN PATENT DOCUMENTS

| | | | | |
|---|---|---|---|---|
| DE | 100 09 116 A1 | 8/2001 | | |
| DE | 102 45 916 A1 | 4/2004 | | |
| DE | 10 2005 062 907 B3 | 5/2007 | | |
| DE | 10 2014 013 756 B3 | 2/2016 | | |
| DE | 10 2015 105 791 A1 | 10/2016 | | |
| DE | 10 2016 005 318 A1 | 11/2017 | | |
| DE | 10 2016 010 461 A1 | 3/2018 | | |
| DE | 10 2016 010 462 A1 | 3/2018 | | |
| DE | 10 2016 010 463 A1 | 3/2018 | | |
| DE | 10 2016 010 464 A1 | 3/2018 | | |
| DE | 102016011390 A1 * | 3/2018 | ............ | B60T 13/683 |
| DE | 10 2017 002 716 A1 | 9/2018 | | |
| DE | 10 2017 002 718 A1 | 9/2018 | | |
| DE | 10 2017 002 719 A1 | 9/2018 | | |
| DE | 10 2017 002 721 A1 | 9/2018 | | |
| DE | 102017005980 A1 * | 9/2018 | .............. | B60T 8/362 |
| DE | 10 2018 103 605 A1 | 8/2019 | | |
| WO | 2019/048174 A1 | 3/2019 | | |
| WO | 2019/170925 A2 | 9/2019 | | |

OTHER PUBLICATIONS

Robert Bosch Gmbh, "Kraftfahr-technisches Taschenbuch", Braunschweig/Wiesbaden, Apr. 2002, Ed. 24, ISBN: 3-528-13876-9, pp. ND1, 760-765.
Translation and Chinese Office action dated Apr. 10, 2024 for corresponding Chinese application No. 202080075614.X.
International Search Report of the European Patent Office dated Feb. 3, 2021 for international application PCT/EP2020/082387 on which this application is based.

* cited by examiner

FAIL-SAFE VALVE UNIT, ELECTRONICALLY CONTROLLABLE PNEUMATIC BRAKE SYSTEM, METHOD FOR OPERATING A BRAKE SYSTEM

CROSS REFERENCE TO RELATED APPLICATIONS

This application is a continuation application of international patent application PCT/EP2020/082387, filed Nov. 17, 2020 designating the United States and claiming priority from German applications 10 2019 131 112.8, filed Nov. 18, 2019, and 10 2020 130 277.0, filed Nov. 17, 2020, and the entire content of the above applications is incorporated herein by reference.

TECHNICAL FIELD

The present disclosure relates to a fail-safety valve unit. The disclosure furthermore relates to an electronically controllable pneumatic braking system for a vehicle having such a fail-safety valve unit, and to a vehicle, in particular a utility vehicle, having an electronically controllable pneumatic braking system of the type mentioned above. The disclosure also relates to a method for operating a braking system of the type mentioned above.

BACKGROUND

In modern electronically controllable pneumatic braking systems, which are used in particular in utility vehicles that are intended for autonomous driving, it is important to provide measures that allow safe deceleration of the utility vehicle even in the event of a fault in the braking system. Approaches here include using fully redundant braking systems, partially redundant braking systems or only different levels in one braking system, such that, in the event of a fault in a first level, the braking system can continue to be operated, at least with restrictions, in a second level.

However, if a double fault occurs, for example, which affects both the primary braking system and the redundant braking system, there is a risk that the utility vehicle can no longer be braked in a controlled manner. In such situations, there is a need to provide a system that allows safe deceleration of the vehicle.

A system that is aimed in particular at achieving high residual availability is known, for example, from US 2017/0267221. The document discloses electrical equipment of a vehicle with an at least partially electric braking and steering device, which includes: an electric or electromechanical steering device, which is connected to a steering gear and which includes an electronic steering control device and an electric steering actuator, and a service brake device. As a service brake device, US 2017/0267221 proposes an electropneumatic service brake device which includes an electropneumatic service brake valve device, an electronic brake control device, electropneumatic modulators and pneumatic wheel brake actuators, wherein the electronic brake control device electrically controls the electropneumatic modulators in order to generate pneumatic brake pressures or brake control pressures for the pneumatic wheel brake actuators on a wheel-specific, axle-specific or side-specific basis. The electropneumatic service brake valve device has a service brake actuation element and also, within an electrical service brake circuit, an electrical channel with an electrical brake signal transmitter that can be actuated by the service brake actuation element. Furthermore, an electronic evaluation device is provided which receives the actuation signals and, in a manner dependent on the actuation signals, inputs braking demand signals into the electronic brake control device and, within at least one pneumatic service brake circuit, includes at least one pneumatic channel, in which actuation of the service brake actuation element owing to a driver's braking demand causes at least one control piston of the service brake valve device to be loaded with a first actuating force and, in response to this, the control piston makes it possible to generate pneumatic brake pressures or brake control pressures for the pneumatic wheel brake actuators. The electronic evaluation device of the electropneumatic service brake valve device furthermore includes electronic control means for generating, independently of a driver braking demand, a second actuating force which, in the presence of a braking demand that is independent of the driver demand, acts on the control piston in the same direction as or in the opposite direction to the first actuating force. The electropneumatic service brake device is supplied by an electrical power source which is independent of a second electrical power source which supplies the electropneumatic service brake valve device with electrical power. It is hereby ensured that, as far as possible, always at least one of the two systems is functional. The electric or electropneumatic steering device is supplied with power by the second electrical power source. It is sought in this way to achieve high residual availability. However, the system is complex and thus cannot be readily implemented in every utility vehicle.

A system that provides electronically pneumatically controlled redundancy is disclosed in US 2019/0152459. The system disclosed in the document uses a bypass valve in order, depending on the failure of a subsystem, to transmit control pressures in order to provide an at least pneumatic supply to the circuit in which an electrical failure has respectively occurred. This, too, increases the residual availability. Similar systems are disclosed in US 2019/0193705 and in US 2019/0248351.

Furthermore, US 2019/0248350 discloses a system and method in which pilot control valves are electronically controlled by way of a redundancy signal if a failure or a defect is detected in the electronic control of wheel brakes of the braking system. Here, the system seeks to prevent the wheels from locking.

US 2020/0023820; US 2020/0023827; US 2020/0070795; and, US 2020/0148180 have disclosed systems in which a redundancy is generated pneumatically in each case. Here, different output brake pressures, for example front axle, rear axle or trailer brake pressures, are used in order to be provided as redundancy pressure to failed systems, such as the front axle brake circuit, rear axle brake circuit, parking brake circuit or trailer brake circuit. In this way, a subordinate pneumatic redundancy level is generated, such that high residual availability is likewise achieved.

Furthermore, systems also exist which incorporate the trailer, as disclosed for example in US 2019/0248346.

SUMMARY

It is an object of the disclosure to provide a system which allows safe stopping of the vehicle even when redundant systems, subsystems or levels of the braking system have failed. For example, if a braking system is supplied from several power sources, in the worst case all of the power sources may fail. In this case, too, it is sought to ensure in a simple manner that the vehicle can be safely decelerated.

The disclosure proceeds from a fail-safety valve unit for a failure braking function of an electronically controllable pneumatic braking system for a vehicle, in particular a utility vehicle, wherein the braking system has a first control unit and a second control unit which can be supplied with power independently of one another and/or which can at least partially replace one another in terms of their function, and the fail-safety valve unit has:

a first failure brake valve configured as a monostable valve and a second failure brake valve configured as a monostable valve, and a valve main line which pneumatically connects a main port, which provides a first pressure, and a failure brake port.

According to the disclosure, it is provided in the case of the fail-safety valve unit according to a first aspect of the disclosure that the first failure brake valve and the second failure brake valve are connected pneumatically in series in the valve main line, and the first failure brake valve is controllable by the first control unit and the second failure brake valve is controllable by the second control unit, and the failure brake valves are open in an open position when not actuated, in particular when deenergized, such that the first pressure prevailing at the main port is provided as a failure brake pressure at the failure brake port such that, in a fault situation and/or in the event of an electrical failure and/or in a diagnostic situation of the control units, a failure braking operation of the vehicle is triggered by way of the provision of the failure brake pressure at the failure brake port via the braking system.

A concept of the disclosure includes maintaining the ability to actuate a braking system, in particular a service brake of the braking system, via a separate actuation branch for the purposes of triggering a failure braking operation in the event of a multiple fault, in particular double fault, wherein the actuation branch with the fail-safety valve unit has a number of at least two monostable failure brake valves which are connected pneumatically in series and which open when deenergized. In this case, in each case one failure brake valve is assigned to a control unit, that is, the first failure brake valve is assigned to a first control unit and the second failure brake valve is assigned to a second control unit. The failure brake valves are thus each kept in a blocking state by different, mutually independent control units, by way of a control signal, in the actuated state. In particular, here, the control units are supplied with power independently of one another. The fact that the control units can at least partially replace one another in terms of their function means in particular that the second control unit can redundantly provide functions of the first control unit in the sense of a fallback level if the first control unit should fail. In the event of a multiple fault, that is, a fault affecting multiple control units, and in particular a double fault affecting a primary system with the first control unit and a first fallback level with the second control unit, the monostable, normally opening behavior of the failure brake valves means that the fail-safety valve unit cannot, in the non-actuated state, that is, in the absence of the control signal for the failure brake valves, provide a first pressure—which prevails at a main port—as failure brake pressure at a failure brake port for the braking system.

The disclosure encompasses the finding that, in the case of multiple subsystems of a braking system, each with independent control units, a fault can advantageously be manifest in the absence of a control signal for the respective failure brake valve assigned to the control unit. This may be the case for example in the event of an electrical failure, that is, if the electrical supply for the control unit has failed. The control unit may also be configured such that, in the event of an exceptional fault, in particular a situation in which the control logic can no longer ensure the safety of the vehicle, a zero signal is output as a control signal for the failure brake valve, and an absence of the control signal is thus simulated.

If this is the case, that is, if there is a fault in both subsystems, in particular in the form of an exceptional fault or electrical failure, the fail-safety valve unit thus ensures safe deceleration of the vehicle by providing a failure brake pressure. Here, a double fault represents a special case of multiple fault, in which two subsystems are affected by a fault at the same time.

It is also possible in the context of the disclosure, through the provision of a greater number of pneumatically series-connected failure brake valves in the fail-safety valve unit, for a corresponding greater number of subsystems to be taken into consideration in the event of a multiple fault.

Furthermore, for the presence of a multiple fault, different fault types may be present at the various control units, for example an exceptional fault in the first control unit and an electrical failure in the second control unit. It is important merely that all control units affected by the multiple fault fail at the time of the multiple fault, that is, are no longer operational, and this is manifest in the absence of the respective control signal.

In the context of the disclosure, the fail-safety valve unit is formed at least from the series connection of the first and second failure valves, that is, in the context of the disclosure in its minimal form, the failure valve unit has a series connection of the first and second failure valves.

The disclosure is further refined in that the first failure brake valve and the second failure brake valve are configured as 3/2 directional solenoid valves. In such a refinement, in which the failure brake valves are each configured as 3/2 directional solenoid valves, the effect according to the concept of the disclosure, whereby the failure brake valve automatically switches into an open position in the non-actuated state, can be advantageously achieved because the magnet part of the valve remains deenergized in the non-actuated state, and the valve is thus moved back into the open position, in particular by a restoring spring.

It can be preferable for a bistable valve arranged in the valve main line to be provided, which bistable valve is configured to switch between a first position, in which it blocks the valve main line or connects the latter to a vent, and a second position, in which it connects the valve main line. Via such a bistable valve, the fail-safety valve unit can advantageously be operated both in a mode suitable for automatic operation of the vehicle and in a mode suitable for manual operation of the vehicle. In particular, the bistable valve is configured such that, in the first position, in which the bistable valve blocks the valve main line, the valve main line is pneumatically connected to a vent of the bistable valve at a first bistable valve port, and at the same time the valve main line is blocked at a second bistable valve port, and in a second position, in which the bistable valve pneumatically connects the valve main line, the valve main line between the first and second bistable valve port is pneumatically connected, and at the same time the vent of the bistable valve is blocked.

If the bistable valve is situated in a first position, in which it blocks the valve main line, a failure brake pressure is prevented per se from being provided at the failure brake port of the fail-safety valve unit, irrespective of the position of the failure brake valves. In this first position, a failure braking operation that would be caused by a double fault is thus prevented. This may advantageously be the case in particular during manual operation of the vehicle, in particular if a human driver is to retain control of the vehicle. By contrast to this, the bistable valve can be switched to a second position, in which it pneumatically connects the valve main line, in order that—if all failure brake valves of the fail-safety valve unit are situated in an open position—the failure brake pressure can be provided at the failure brake port for the purposes of triggering a failure braking operation of the vehicle. According to the concept of a bistable valve, this remains in its switching position, specifically even in the deenergized state and, in particular, irrespective of any faults in the braking system. The bistable valve is controlled in particular via a valve control unit, which in turn is connected with signal and/or power transmission capability to a control unit of the braking system and/or to a vehicle bus.

According to an aspect of the disclosure, a pressure sensor is included, wherein the pressure sensor is arranged downstream of the first and the second failure brake valve as viewed in a flow direction directed from the main port to the failure brake port. The functioning of the failure brake valves can advantageously be checked, and/or checked for plausibility, via a pressure sensor arranged downstream of the failure brake valves in a flow direction. In particular, the pressure sensor may be connected to a valve control unit of the fail-safety valve unit or to some other control unit of the braking system or to a vehicle bus of the vehicle in order to provide a corresponding pressure signal there.

A pressure limiting valve is preferably provided, which is configured to limit the first pressure and/or the failure brake pressure. Via a pressure limiting valve, a first pressure provided at the main port can be limited to a failure brake pressure that is particularly suitable for a failure braking operation.

According to an aspect of the disclosure, a failure brake pressure setting device is included and is configured for controllably setting the failure brake pressure. Via a failure brake pressure setting device, it is possible—analogously to the pressure limiter—for the first pressure provided at the main port to be limited to a failure brake pressure that is suitable for a failure braking operation, but with the difference that the limitation and thus the level of the failure brake pressure can be adapted during the operation of the vehicle. It is thus advantageously possible, in a manner dependent on different operating conditions, in particular loading conditions of the vehicle or road and environmental conditions, for a set pressure that is suitable for a failure braking operation occurring under these operating conditions to be set as failure brake pressure. Should an emergency braking operation or a failure braking operation thus occur in the event of a multiple fault, then the vehicle is brought to a standstill under the most suitable and safe conditions possible. For example, via a failure brake pressure setting device, a higher failure brake pressure can be provided in the case of a heavily laden vehicle.

It is advantageously provided that the failure brake pressure setting device is configured to set the failure brake pressure in a manner dependent on an operating profile, wherein the operating profile is formed in particular on the basis of at least one of the following parameters: vehicle combination, loading situation, road conditions, coefficient of friction. Via an operating profile, it is for example possible for preset values for a failure brake pressure that are suitable for typical operating conditions to be selected and set. This may in particular be realized, in a manner understandable to a driver of the vehicle, by way of an input module of the vehicle controller, for example on the dashboard of the vehicle or an on-board computer. For example, before commencing a journey, the driver may specify the loading of their vehicle by way of a query in a context menu, whereupon a control unit or ECU of the vehicle controller or of the braking system calculates a suitable operating profile including the failure brake pressure.

Provision is advantageously made for the failure brake pressure setting device to be configured as a pneumatic setting device. A refinement with a pneumatic setting device preferably has a relay valve arrangement. In particular, the relay valve arrangement is configured for controllably setting a set pressure, and has in particular a control valve and a pressure-maintaining valve, via which a control pressure can be maintained at a control port of the relay valve. In this way, a pneumatically settable failure brake pressure can be provided in the form of a set pressure. The control valve and the pressure-maintaining valve may advantageously be controlled via a valve control unit. In this case, in particular in the sense of a closed control loop, the valve control unit may set a set pressure, which is output at the relay valve, on the basis of a measured pressure by opening and closing the control and pressure-maintaining valve. The pressure may correspondingly be measured via a pressure sensor that is pneumatically connected to a second relay valve port, at which the set pressure is output.

According to an aspect of the disclosure, a shuttle valve is included, via which on the one hand a set pressure or on the other hand a first pressure provided at the main port, in particular a limiting pressure provided by a pressure limiting valve, can be provided at a third shuttle valve port of the further valve main line and ultimately at the failure brake port. The shuttle valve may in particular be configured such that, of a first and a second shuttle valve port, that shuttle valve port at which the higher pressure prevails is pneumatically connected to the third shuttle valve port.

Provision is advantageously made for the failure brake pressure setting device to be configured as an electrical setting device. An electrical setting device may in particular have a motor valve arrangement. In particular, such a motor valve arrangement may be formed by a pressure limiting valve that can be adjusted in an electrically controllable manner via an electric motor. Such an electric motor may be actuatable via a valve control unit.

A valve control unit is preferably provided, wherein the valve control unit is configured for setting of the failure brake pressure setting device by open-loop and/or closed-loop control. Via a valve control unit, the failure brake pressure setting device can advantageously be actuated on the basis of a specification such that a suitable failure brake pressure is provided by the fail-safety valve unit. Such a specification may be given in particular by an operating profile that can be stored in the valve control unit, in particular in an operating profile memory.

In an embodiment, it is provided that the main port is pneumatically connected to a holding brake function for the purposes of receiving an output holding brake pressure, or a pressure derived therefrom, as a first pressure. The refinement encompasses the finding that continuously maintaining the braked state of the vehicle is important for the safety of the vehicle. After a failure braking operation by the fail-safety valve unit, a leak may occur in the service brake circuit that performs the failure braking operation, in particular in a control line of a pneumatic front axle brake circuit, or at a front axle modulator or at some other point in a separate actuation branch in which the fail-safety valve unit is arranged. In the case of such a leak, if the connected pressure supply is progressively emptied, the failure brake pressure can drop, and a diminishment of the action of the emergency braking can thus occur.

By virtue of the main port being pneumatically connected to a holding brake function for the purposes of receiving an output holding brake pressure as a first pressure, it is advantageously achieved that, if a leak occurs after a failure braking operation by the fail-safety valve unit, the at least one holding brake cylinder is likewise pneumatically connected to the leaking part. Owing to the fail-safety valve unit configured according to the refinement, a leak thus leads to an engagement of the holding brake and thus to the braked state of the vehicle being safely maintained. The engagement of the holding brake is achieved by way of a ventilation of the holding brake cylinder and an action of a pressure spring, which relaxes in the process, on a wheel brake.

Via a fail-safety valve unit configured according to the refinement, the pneumatic connection of a service brake circuit which performs the failure braking operation, in particular a front axle brake circuit of the service brake, to the output holding brake pressure is thus utilized in targeted fashion to compensate, by way of the onset of the action of the holding brake, the diminishing action of the service brake circuit, which performs the failure braking operation, in the event of a pressure loss. In particular, this process may take place relatively slowly, in the range of hours or even days, in particular in a manner dependent on the size of the leak.

In particular, the holding braking system and/or the holding brake function includes a holding brake module. The holding brake function is preferably configured to output a holding brake pressure for the purposes of pressurizing holding brake cylinders. The holding brake function is preferably provided by a holding brake module. In refinements, the holding brake function may be provided by some other pneumatic or electropneumatic device, for example an axle modulator, a trailer control module or similar pneumatic or electropneumatic device.

In particular, the main port is pneumatically connected to a holding brake cylinder, preferably to two holding brake cylinders arranged on respective sides of the vehicle. In particular, the main port is pneumatically connected to at least one holding brake chamber of the holding brake cylinder.

According to an aspect of the disclosure, a selection valve is included and has a first port, which is pneumatically connected to the holding brake function, in particular to a holding braking system and/or the holding brake module for the purposes of receiving the first pressure, with a second port, which is pneumatically connected to a further compressed air supply for the purposes of receiving a further supply pressure as second pressure, and with a third port, which is pneumatically connected to the failure brake valve, wherein the selection valve is configured to pneumatically connect that one of the first and second ports at which the higher pressure prevails to the third port, and in particular to block the respective other port.

A refinement with a selection valve encompasses the finding that a redundant supply of compressed air to the fail-safety valve unit advantageously increases the safety of the vehicle. Via a selection valve with a first port that is pneumatically connected to a holding braking system for the purposes of receiving the first pressure, the availability of a first compressed air source for providing a failure brake pressure can advantageously be provided, which is in particular independent of that compressed air source of the brake circuit, in particular of a service brake circuit to which the failure brake pressure is provided, which is used during normal operation. Redundancy is thus already advantageously achieved through the use of a separate brake circuit.

Via a second port of the selection valve, which is pneumatically connected to a further compressed air supply for the purposes of receiving a further supply pressure as second pressure, a yet further compressed air source that is independent of the holding braking system is advantageously provided as yet further redundancy. The further compressed air supply may in particular also be a compressed air supply of the service braking system.

By virtue of the fact that the failure brake valve has a third port, which is pneumatically connected to the failure brake valve, and the failure brake valve is configured to pneumatically connect that one of the first and second ports at which the higher pressure prevails to the third port, it is advantageously the case that, even in the event of a failure of a compressed air source at one of the first and second ports, the other, available compressed air source is automatically connected to the failure brake valve.

The availability of the failure brake function and thus the safety of the vehicle are thus advantageously yet further increased by way of the selection valve.

Provision is preferably made for the failure brake pressure to be provided as control pressure for an axle modulator, in particular for a front axle modulator, or for the failure brake pressure to be provided as brake pressure for a brake cylinder. If the failure brake pressure is provided as brake pressure for a brake cylinder, a full supply of the compressed air required for failure braking operation can advantageously be achieved via the fail-safety valve unit if, in particular, the brake cylinder is fully activated with the failure brake pressure via the compressed air provided by the fail-safety valve unit. If the failure brake pressure is provided as brake pressure for a modulator, the failure brake pressure acts in particular on a control port of the modulator, wherein the modulator acts in particular to increase an air flow rate and is supplied in particular by a further compressed air source or compressed air supply. The control port of the modulator is in particular a redundancy port of the modulator.

In a second aspect, to achieve the object, the disclosure furthermore specifies an electronically controllable pneumatic braking system for a vehicle, in particular a utility vehicle, having a first control unit for a primary system and a second control unit for a first fallback level, wherein the first control unit and the second control unit can be supplied with power independently of one another and/or can at least partially replace one another in terms of their function. In the electronically controllable pneumatic braking system, a fail-safety valve unit according to at least one of the above-described preferred embodiments of a fail-safety valve unit according to the first aspect of the disclosure is provided, wherein the fail-safety valve unit is arranged in a separate actuation branch and is pneumatically connectable via a failure brake port to at least one brake cylinder for the purposes of providing a failure brake pressure for the purposes of triggering a failure braking operation of the vehicle. The advantages of the fail-safety valve unit are advantageously utilized in the braking system. Here, a "separate actuation branch" means that the fail-safety valve unit is arranged in an additional pneumatic actuation branch, which is formed separately from a primary pneumatic actuation branch, which in particular has a brake signal transmitter. In particular, the failure brake pressure is provided for an axle modulator or for a brake cylinder.

In a refinement of the electronically controllable pneumatic braking system, it is provided that the first control unit is connected with actuation capability to a first failure brake valve of the fail-safety valve unit and the second control unit is connected with actuation capability to a second failure brake valve of the fail-safety valve unit. In such a refinement, the respective failure brake valves of the fail-safety valve unit according to the first aspect of the disclosure can advantageously be actuated by two independent control units.

In a refinement of the electronically controllable pneumatic braking system, it is provided that the main port is pneumatically connected to a holding brake function for the purposes of receiving an output holding brake pressure, or a pressure derived therefrom, as a first pressure.

In a refinement of the electronically controllable pneumatic braking system, a compressed air accumulator is provided which provides a first pressure, wherein the compressed air accumulator is independent of a further compressed air supply assigned to the axle modulator for operation. In particular, the compressed air accumulator is independent of a compressed air supply assigned to a service braking system of the braking system, and is thus formed for example by a compressed air accumulator assigned to a holding braking system. In such a refinement, the independence of the fail-safety valve unit or of the failure brake functionality can advantageously be increased because the compressed air for actuating the service brake cylinders for the purposes of performing a failure braking operation is taken from a compressed air accumulator which, during normal operation, is assigned to another subsystem of the braking system, in particular to a holding braking system. The compressed air accumulator is preferably independent of a compressed air supply that is assigned to a front axle modulator.

To achieve the aforementioned object, the disclosure furthermore leads, in a third aspect, to a vehicle, in particular utility vehicle, having a braking system according to the concept of the disclosure. The advantages of the fail-safety valve unit are advantageously utilized in the vehicle.

To achieve the object, the disclosure furthermore leads, in a fourth aspect, to a method for operating a braking system, having the step:

holding a first pressure in reserve in a fail-safety valve unit that is arranged pneumatically in a separate actuation branch. In the method, it is provided that the first pressure is held back by actuation of at least one first and one second failure brake valve, which are connected pneumatically in series, and in the event of a multiple fault, in particular a double fault, or in a diagnostic situation, the first pressure is, as a result of an interruption of the actuation of the at least two failure brake valves, provided as a failure brake pressure to at least one brake cylinder of the braking system for the purposes of triggering a failure braking operation.

The advantages of the fail-safety valve unit are advantageously utilized in the method.

In a refinement of the method, it is provided that the interruption of the actuation occurs as a result of a deenergization of the at least one first and second failure brake valve. Here, a deenergization means that the at least two failure brake valves are brought into a state in which the actuators, in particular magnet parts of the failure brake valves, are not energized, that is, are deenergized.

In a refinement of the method, it is provided that the failure brake pressure is set in a manner dependent on an operating profile.

In the context of the method according to the fourth aspect of the disclosure, the fail-safety valve unit is preferably configured according to at least one of the above-described preferred embodiments of a fail-safety valve unit according to the first aspect of the disclosure. In the context of the method according to the fourth aspect of the disclosure, the braking system is preferably configured as a braking system according to the third aspect of the disclosure.

In a refinement of the method, it is provided that the failure brake pressure is a holding brake pressure output by a holding brake function for the purposes of pressurizing holding brake cylinders, or is a pressure derived therefrom.

In a refinement of the method according to the fourth aspect of the disclosure, a diagnostic process is provided, having the step:

ascertaining the failure brake pressure, preferably via a pressure sensor, at the failure brake port, wherein, before the interruption of the provision of the signal, preferably in a diagnostic situation of the control unit, an outputting of pressure in the service braking system, preferably a brake demand to an axle modulator, is demanded.

In particular, a diagnostic situation encompasses a diagnostic process. By contrast to the fault situation and the electrical failure, the diagnostic situation constitutes a state of a control unit, in particular of the first and second control unit, which is intentionally brought about for diagnostic purposes and in which, preferably, the state of the signal or signals for locking out a failure brake pressure that takes effect for a failure braking operation corresponds to the state in a fault situation and/or in the event of an electrical failure. It is preferable if, in a diagnostic situation, the provision of the signal for locking out a failure brake pressure that takes effect for a failure braking operation is interrupted.

The braking demand is preferably provided by a brake signal transmitter. In particular, the braking demand is provided via a vehicle data bus. Preferably, the braking demand and/or the demand for outputting of pressure in the service braking system is in the form of an XBR signal or a similar signal of a vehicle data bus.

A possible plausibility error in the braking system, in particular in the control unit, is advantageously avoided in that, before the interruption of the provision of the signal, an outputting of pressure in the service braking system, in particular a brake demand to an axle modulator, is demanded. Such a plausibility error would be identified, in particular by the control unit, if a pressure were input into the service braking system by the fail-safety valve unit without a corresponding braking demand, such as a deflection of the brake signal transmitter, in particular of a brake pedal, taking place. The pressure input into the service braking system may in particular be measured via an axle modulator pressure sensor.

Correct functioning of the fail-safety valve unit can advantageously be checked or ensured via the diagnostic process. The diagnostic process may be initiated in various ways. On the one hand, the diagnostic process may be carried out during the operation of the vehicle, by way of a braking operation initiated by a braking demand. This is the case, for example, if a driver transmits an electronic braking demand to an axle modulator via the brake value transmitter—or the control unit in automatic driving mode.

In particular, the outputting of pressure is demanded electrically or electronically via the control unit and an electrical axle modulator control line, in particular an electrical front axle modulator control line or electrical rear axle modulator control line. In particular, the braking demand is an electrical or electronic braking demand.

Provision is preferably made for the fail-safety valve unit to be supplied pneumatically by a brake circuit which is independent of that brake circuit of the service braking system which performs the failure braking operation. To "supply pneumatically" means to provide compressed air, in particular at a first pressure, which is provided as the failure brake pressure during the opening of the at least one failure brake.

The fail-safety valve unit is preferably supplied pneumatically by a pressure supply which is independent of the pressure supply of that brake circuit of the service braking system which performs the failure braking operation. In particular, the failure brake pressure is provided by a pressure supply of the holding braking system or by a further pressure supply.

Provision is preferably made for the diagnostic process to be carried out during a service braking operation of the service braking system, in particular while a braking demand is present. During a service braking operation, a braking demand is transmitted to the axle modulator that performs the braking operation. Such a braking demand is in particular electrical or electronic, and may be provided by a brake signal transmitter or a control unit, for example an external control unit and/or an automatic operation control unit. The provision of the failure brake pressure is advantageously possible in this case, because an application of pressure and a correspondingly increasing pressure measured by the axle modulator pressure sensor are expected in any case. The effect of a failure braking operation owing to the provision of the failure brake pressure would advantageously not be noticeable, or be noticeable only to a small extent, during a service braking operation, because braking of the vehicle is demanded in any case.

In other refinements of the method, the diagnostic process is alternatively or additionally carried out while the vehicle is stationary, wherein, in particular, a braking demand is generated in particular by an external control unit and/or an automatic operation control unit. In a stationary state, an actuation of the service brake initiated by the provision of the failure brake pressure would not be noticeable, because the vehicle is stationary. However, a braking demand is advantageously generated in this case, too, in order to avoid a plausibility error in the control unit of the braking system.

It is preferably provided that the braking demand is provided by a brake signal transmitter and/or by an external control unit and/or by an automatic operation control unit. In particular, the braking demand is provided via a vehicle data bus. In particular, the braking demand is in the form of a CAN signal, in particular in the form of an XBR signal.

In a refinement of the method, the following steps are provided:

providing a signal for an individual valve, in particular for an individual failure brake valve or an individual bistable valve, ascertaining the failure brake pressure, in particular checking the plausibility of the pressure reaction for the individual valve. In a refinement, the method may additionally have the step: checking the plausibility of the pressure reaction for a pressure limiting valve.

A plausibility check includes checking whether an ascertained pressure value corresponds to an expected pressure value. A pressure reaction for a valve is in particular the change in pressure, or the expected change in pressure, associated with activation of the valve. A plausibility check may in particular include checking whether no pressure prevails, that is, whether the pressure is equal to or close to zero, because the valves should close (=not be pressurized) when actuated or when the signal is provided. In this way, the diagnosis can advantageously be differentiated, because the reaction of individual valves can be checked. It is advantageous if, initially, all valves are left in the non-actuated state and/or—in particular in the case of a bistable valve—in their pressurization position. In this case, the output failure brake pressure should be measured at the pressure sensor. If this is not the case, a fault is output. The individual valves of the fail-safety valve unit may subsequently be actuated in succession in order to check the reaction. For example, the failure brake valve is switched, by actuation, into its blocking position, as a result of which the measured pressure should drop. If this is not the case, it can be concluded that there is a fault associated with the failure brake valve, which may lie for example in the mechanism of the valve, in the magnet part or in the control line. Such an individual check may be analogously performed for the other valves, in particular a further failure brake valve and/or a bistable valve.

A diagnostic process or a diagnostic situation may advantageously be carried out automatically at regular intervals in order to check and ensure the function of the fail-safety valve unit and in particular to identify dormant faults in the fail-safety valve unit at an early stage. For example, a diagnostic process may be carried out every time the vehicle is started, or when the vehicle is started after a specified number of starts. In particular, the diagnostic process may be carried out as part of a superordinate self-diagnosis of the vehicle. In particular, the diagnostic process may be carried out during a service braking operation after a specified number of service braking operations, or during a service braking at specified time intervals (for example once a day or once a week or once a month).

It should be understood that the fail-safety valve unit according to the first aspect of the disclosure, the braking system according to the second aspect of the disclosure, the vehicle according to the third aspect of the disclosure and the method according to the fourth aspect of the disclosure have identical and similar sub-aspects. In this respect, for the refinement of one aspect of the disclosure, reference is also made to the refinements of the other aspects of the disclosure.

BRIEF DESCRIPTION OF THE DRAWINGS

The invention will now be described with reference to the drawings wherein.

DESCRIPTION OF THE PREFERRED
EMBODIMENTS

Figure 1:
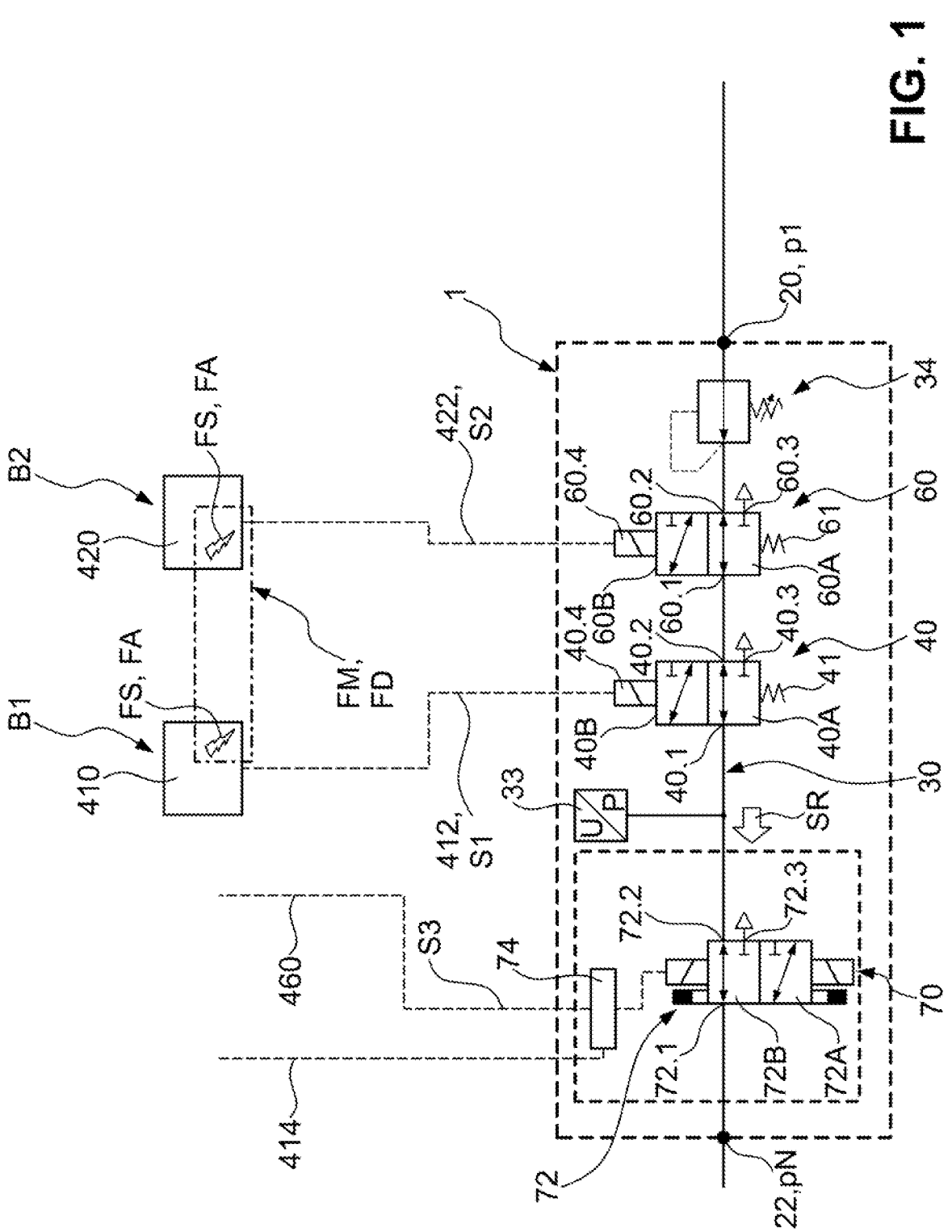
FIG. 1 shows a fail-safety valve unit according to the disclosure.

FIG. 1 shows a fail-safety valve unit 1 according to the disclosure. The fail-safety valve unit 1 has a first monostable failure brake valve 40 and a second monostable failure brake valve 60.

The first failure brake valve 40 is connected with signal and power transmission capability to a first control unit 410 via a first control line 412. The first control unit 410 is in this case assigned to a primary system B1 of a braking system 204 that is not illustrated in any more detail here. The second failure brake valve 60 is connected with signal and power transmission capability to a second control unit 420 via a second control line 422. The second control unit 420 is assigned to a first fallback level B2 of the braking system 204 that is not illustrated in any more detail here.

The two failure brake valves 40, 60 are arranged so as to be connected pneumatically in series in a valve main line 30 of the fail-safety valve unit 1. The valve main line 30 extends here from a main port 20 to a failure brake port 22.

Both failure brake valves 40, 60 are illustrated here in a non-actuated and deenergized state, in which they are each situated in an open position 40A, 60A. In the first open position 40A, a pneumatic connection is established between a first valve port 40.1 and a second valve port 40.2 of the first failure brake valve 40. In the second open position 60A, a pneumatic connection is established between a first valve port 60.1 and a second valve port 60.2 of the second failure brake valve 60. When both failure brake valves 40, 60 are each situated in the open position 40A, 60A, a compressed air flow can pass in a flow direction SR from the main port 20 to the failure brake port 22 in order to provide a failure brake pressure pN.

By virtue of a first control signal S1 being provided via the first control line 412, the first failure brake valve 40 can be switched from the open position 40A into a first blocking position 40B counter to the resistance of a first restoring spring 41. In the blocking position 40B, a pneumatic connection is established between the first valve port 40.1 and a ventilation port 40.3. By virtue of a second control signal S2 being provided via the second control line 422, the second failure brake valve 60 can be switched from the open position 60A into a second blocking position 60B counter to the resistance of a second restoring spring 61. In the blocking position 60B, a pneumatic connection is established between the first valve port 60.1 and a ventilation port 60.3.

During normal operation of the vehicle 200, provision is made in particular for the two failure brake valves 40, 60 to be situated in their respective blocking positions 40B, 60B. In this state, there is therefore no pneumatic connection between the main port 20 and the failure brake port 22, because the pneumatic connection is interrupted at least at two points, namely at the first failure brake valve 40 and at the second failure brake valve 60.

In the event of a multiple fault FM, in particular a double fault FD, that is, if both a first control signal 51 and a second control signal S2 are absent—and a first magnet part 40.4 of the first failure brake valve 40 and a second magnet part 60.4 of the second failure brake valve 60 are therefore deenergized—both the first failure brake valve 40 and the second failure brake valve 60 automatically return to their open position 40A, 60A owing to the restoring force generated by the respective restoring spring 41, 61.

Such a double fault FD may arise for example as a result of a simultaneous electrical failure FS both in the primary system B1 and in the first fallback level B2, if both the first control unit 410 and the second control unit 420 are without a power supply. In the case of such a simultaneous electrical failure, it is correspondingly not possible for a control signal to be transmitted to the failure brake valves 40, 60.

Furthermore, a double fault FD may also be manifest in the fact that an exceptional fault FA occurs both in the first control unit 410 and in the second control unit 420, and a zero signal is transmitted by the respective control unit 410, 420 as a fault measure (in particular in the absence of other program alternatives), and thus—in order to switch the failure brake valves 40, 60 into the open position 40A, 60A—the control signals S1, S2 are intentionally set to 0. In FIG. 1, the simultaneity of the multiple fault FM or of the double fault FD is indicated by the electrical failures or exceptional faults FS, FA in the respective control units 410, 420 being outlined by a dash-dotted box. Here, for the presence of a multiple fault FM, different types of faults may be present in the individual control units 410, 420, for example, in the case of a double fault FD, an electrical failure FS in one control unit 410, 420 and an exceptional fault FA in the other control unit 410, 420.

The fail-safety valve unit 1 furthermore has a pressure limiting valve 34, which in the present case is arranged in the valve main line 30 between the main port 20 and the second failure brake valve 60 such that a first pressure p1 prevailing at the main port 20 is limited to a fixed value, which is set manually at the pressure limiting valve 34, before being provided as failure brake pressure pN at the failure brake port 22. The value set manually at the pressure limiting valve 34 is generally set once, or is in a preset delivery state and, in this case, is not changed further during the operation of the braking system.

The fail-safety valve unit 1 furthermore has a bistable valve unit 70 with a bistable valve 72 which is arranged in the valve main line 30. The bistable valve 72 is illustrated here in a second position 72B, in which a pneumatic connection is established between a first bistable valve port 72.1 and a second bistable valve port 72.2. In a first position 72A of the bistable valve 72, the second bistable valve port 72.2 is blocked, and a pneumatic connection is established between the first bistable valve port 72.1 and a vent 72.3. The bistable valve 72 can be actuated via a valve control unit 74. The valve control unit 74 is connected to a first vehicle bus line 460 for the purposes of receiving a third control signal S3, and to a first supply line 414 for the purposes of power supply. Here, the valve control unit 74 does not necessarily have to be arranged in the bistable valve unit 70, but may for example also be arranged at some other location within the braking system.

The fail-safety valve unit 1 furthermore has a pressure sensor 33, in particular for checking the plausibility of the function of the failure brake valves 40, 60.

Figure 2:
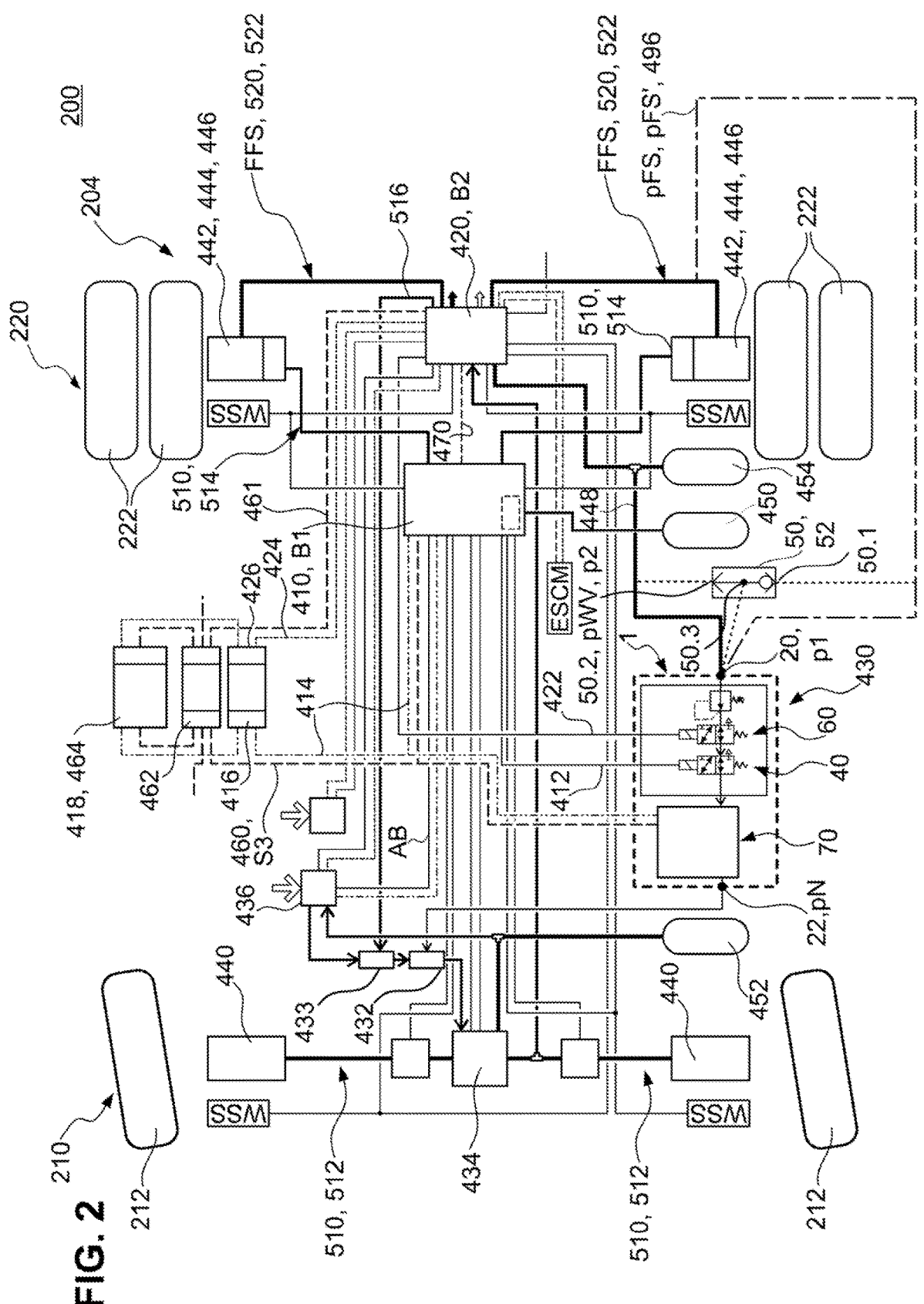
FIG. 2 shows an electronically controllable pneumatic braking system with a fail-safety valve unit according to the disclosure.

FIG. 2 shows an electronically controllable pneumatic braking system 204 with a fail-safety valve unit 1 according to the disclosure. The electronically controllable pneumatic braking system 204 is used in the present case in a vehicle 200 configured as a utility vehicle 202, which is illustrated here in highly schematic form, in particular with two front wheels 212 on a front axle 210 and four rear wheels 222 on a rear axle 220.

A primary system B1 of the electronically controllable pneumatic braking system 204 is controlled via a first control unit 410. A first fallback level B2 of the electronically controllable pneumatic braking system 204 is controlled via a second control unit 420. The first control unit 410 is connected with power transmission capability to a first energy supply 416 via a first supply line 414. The second control unit 420 is connected with power transmission capability to a second power supply 426 via a second supply line 424.

The first control unit 410 is configured to, by electronic actuation of an electronically actuated brake signal transmitter 436 and/or of a front axle modulator 434, supply a pneumatic front axle circuit 512 of a service braking system 510 of the electronically controllable pneumatic braking system 204 with compressed air from a further compressed air supply 452 in order to actuate at least one service brake cylinder 440 assigned to a front wheel 212. The first control unit 410 is furthermore configured to actuate a respective service brake chamber 444 of at least one holding brake cylinder 442, which is assigned to a rear wheel 222, by pneumatic actuation via a pneumatic rear axle circuit 514. Here, the compressed air for the pneumatic rear axle circuit 514 is provided by an additional compressed air supply 450. The first control unit 410 is thus configured to brake both the front wheels 212 and the rear wheels 222 of the vehicle 200.

The second control unit 420 is configured to actuate a holding brake chamber 446 of the holding brake cylinder 442, which is respectively assigned to the rear wheel 222, by pneumatic actuation via a pneumatic rear axle circuit 522 of a holding braking system 520. The compressed air for the holding braking system 520 is provided here by a compressed air accumulator 454. The second control unit 420 is furthermore configured to pneumatically actuate front axle modulator 434—and via this pneumatic front axle circuit 512 of service braking system 510 with the service brake cylinders 440—via a redundancy circuit 516 of the service braking system 510 and a further front axle shuttle valve 433. The second control unit 420 is thus configured to brake the front wheels 212 of the vehicle 200 in addition to the rear wheels 222, whereby the second control unit is suitable in particular for serving as a control unit for the first fallback level B2.

The first control unit 410 and the second control unit 420 are connected to one another with bidirectional signal transmission capability via a control connection 470.

The compressed air accumulator 454 is connected to the main port 20 of the fail-safety valve unit 1 via a supply line 448. The first failure brake valve 40 is connected with signal and power transmission capability to the first control unit 410 via the first control line 412. The second failure brake valve 60 is connected with signal and power transmission capability to the second control unit 420 via the second control line 422.

The fail-safety valve unit 1 furthermore has the bistable valve unit 70, which is supplied with power via the first supply line 414 and is connected to a first vehicle bus 462 via a vehicle bus line 460. The first vehicle bus 462 is furthermore connected to the first control unit 410 via the vehicle bus line 460.

In the present case, the first vehicle bus 462 is connected to the second control unit 420 by way of a further vehicle bus line 461.

The bistable valve unit 70 with a bistable valve 72 (not shown here) has the characteristic that it is not directly influenced by a fault situation, in particular in the case of a double fault FD, because owing to its bistable characteristic it remains in a previously switched position.

By contrast to this, the first failure brake valve 40 and the second failure brake valve 60, owing to their monostable behavior, have the characteristic that they return into one position, in this case the respective open position 40A, 60A, when deenergized. In this way, according to the disclosure, in a situation in which no control signal S1, S2 is present, or the control signal S1, S2 is present as a zero signal, both at the first failure brake valve 40 and at the second failure brake valve 60, automatic switching of the failure brake valves 40, 60 into their open position 40A, 60A can be achieved. Such a situation of an absent control signal 51, S2, or of a zero signal, occurs in particular in the event of an exceptional fault FA or electrical failure FS in the control units 410, 420.

If the bistable valve 72 is situated in its second position 72B, this is suitable in particular for automatic, in particular autonomous driving operation of the vehicle 200, because in this case a pneumatic connection is established between the first and second bistable valve port 72.1, 72.2, and in this way—in the case of a return of the failure brake valves 40, 60, deenergized, to their open position 40A, 60A—a failure brake pressure pN is provided at the failure brake port 22 for the purposes of braking the vehicle 200. In an automatic, in particular autonomous driving mode, the vehicle 200 can be controlled by an automatic operation control unit 464 which is connected with signal transmission capability to the first vehicle bus 462. In particular, an external control unit 418 may include, or be configured as, the automatic operation control unit 464.

If the bistable valve 72 is situated in its first position 72A, this is suitable in particular for manual driving operation of the vehicle 200. In this case, blocking of the valve main line 30 has the effect of preventing a braking operation from being performed, as a result of a provision of a failure brake pressure pN at the failure brake port 22, in the event of a double fault FD.

If a failure brake pressure pN is provided at the failure brake port 22, the failure brake pressure pN passes to two service brake cylinders 440, assigned to respective front wheels 212, via a front axle shuttle valve 432 and a front axle modulator 434. The service brake cylinders 440 are actuated by being charged with the failure brake pressure pN, as a result of which the front wheels 212 are braked. The fail-safety valve unit 1 is thus arranged in a separate actuation branch 430 of the electronically controllable pneumatic braking system 204, which is provided independently of the normal actuation of the service brake cylinder 440, in particular by way of a brake signal transmitter 436. In general, it is also conceivable for a failure brake pressure pN to be provided for another brake cylinder, for example to the service brake chamber 444 of the holding brake cylinders 442 assigned to the rear wheels 222. In particular, the compressed air accumulator 454 is separate from a further compressed air supply 452, which holds compressed air for the service brake cylinder 440 in reserve during normal operation, in order to increase the independence of the fail-safety valve unit 1 and in this way advantageously provide a redundant failure brake functionality.

In advantageous embodiments, the main port 20 is pneumatically connected to the holding braking system 520. In such embodiments, the main port is in particular not connected to the supply line 448. In particular, the main port 20 is—as illustrated here by dash-dotted lines—connected pneumatically via a pneumatic holding brake line 496 of the holding braking system 520 for the purposes of receiving a holding brake pressure pFS. Alternatively or additionally, the main port 20 may be configured to receive a pressure pFS' derived from the holding brake pressure pFS.

In further advantageous embodiments, the fail-safety valve unit 1 may have a selection valve 50 that is configured in particular as a shuttle valve 52. The selection valve 50 is configured to pneumatically connect that port out of a first selection valve port 50.1 and a second selection valve port 50.2 at which the higher pressure prevails to a third selection valve port 50.3.

In particular, in embodiments with a selection valve 50, a further supply pressure pWV from a further compressed air source, in particular the compressed air accumulator 454, a further compressed air supply 452 or a yet further compressed air supply 450, can be provided as second pressure p2 at the second valve port 50.2. Here, by way of example, a dotted line is used to illustrate a pneumatic connection between the second selection valve port 50.2 and the compressed air accumulator 454. Via the selection valve 50, it can advantageously be ensured that either the holding brake pressure pFS as first pressure p1 or the further supply pressure pWV as second pressure p2 prevails at the main port 20, depending on which selection valve port 50.1, 50.2 the higher pressure prevails at. In this way, redundancy is advantageously achieved if no compressed air is available at either one of the two selection valve ports, for example owing to a leak or a system failure.

A diagnostic process AD for checking the functioning of the fail-safety valve unit 1 can advantageously be carried out in a diagnostic situation FT by an electronic control unit, in particular the control unit 410 or an external control unit 418, in particular an automatic operation control unit 464. The external control unit 418 is, in particular for the purposes of monitoring the control units 410, 420, connected to these with signal transmission capability, in particular via a vehicle bus line 460, 461. The external control unit 418 may particularly advantageously be formed by some other electronic control unit of the vehicle, or as part of some other electronic control unit of this type. Some other electronic control unit of this type, in particular the external control unit 418, may in particular be an automatic operation control unit 464, or an electronic control unit of a steering system, or an electronic control unit of a holding braking system, or an electronic control unit of an air treatment system. An automatic operation control unit 464 may in particular be a so-called virtual driver that generates driving commands on the basis of sensor data, operating data, route data, setpoint data and similar data, and provides these driving commands to the vehicle. Driving commands may include steering commands, acceleration commands and braking commands, in particular a braking demand AB.

Figure 3:
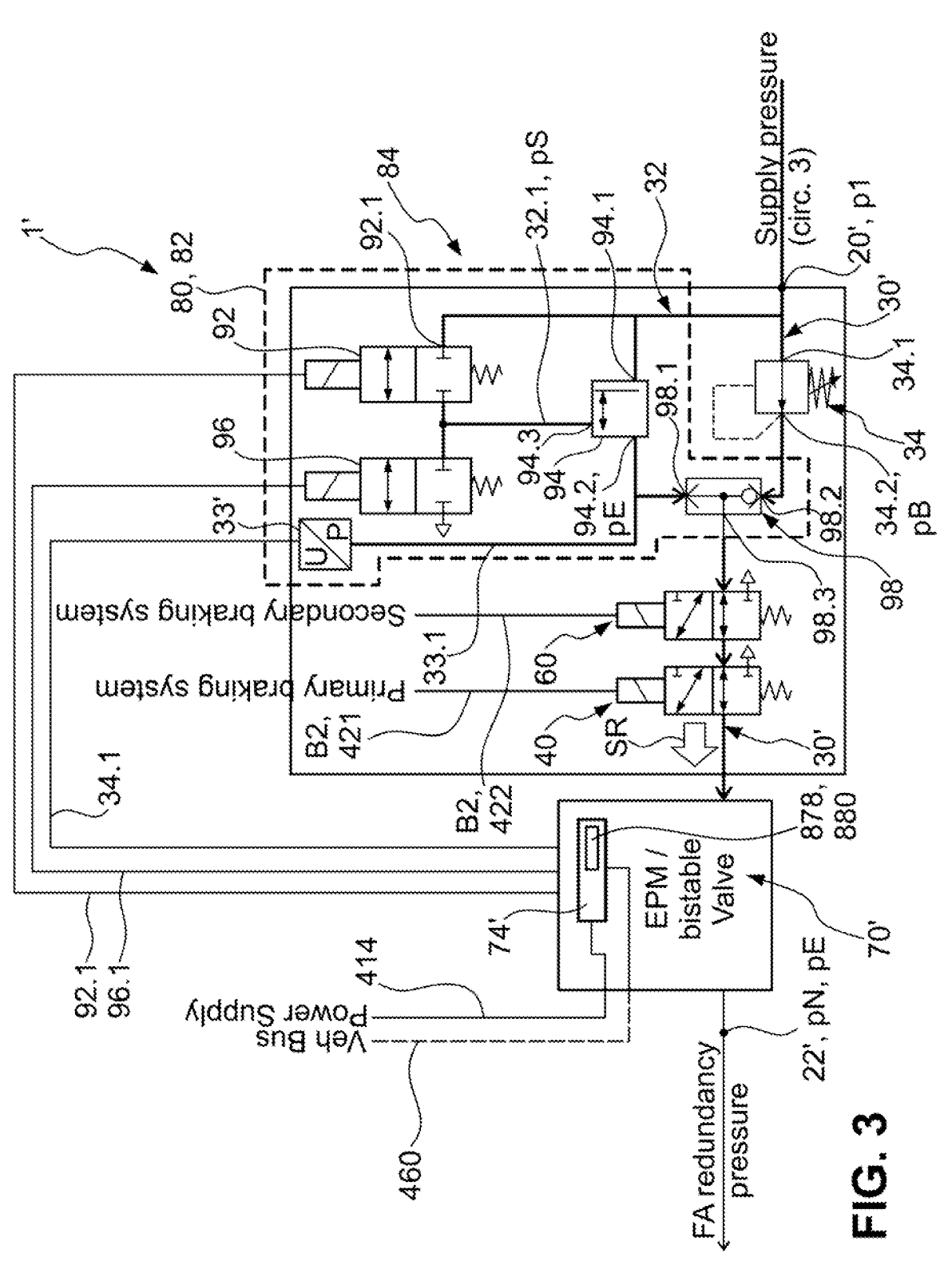
FIG. 3 shows a further embodiment of a fail-safety valve unit according to the disclosure; and, FIG. 4 shows a further embodiment of a fail-safety valve unit according to the disclosure.

FIG. 3 shows a further refinement of a fail-safety valve unit 1', which furthermore has a failure pressure setting device 80, which in the present case is configured as a pneumatic setting device 82. The failure brake pressure setting device 80 has a control valve 92 and a relay valve 94, which together belong to a relay valve arrangement 84. Via a pilot branch 32, the first pressure p1 prevailing at the main port 20' is provided both at a first control valve port 92.1 and at a first relay valve port 94.1.

By virtue of a control pressure pS being set in a control line 32.1 by opening and closing both of the control valve 92 and of a pressure-maintaining valve 96, a set pressure pE can be set at the second relay valve port 94.2.

By opening of the control valve 92, the control pressure pS can be increased by charging the control line 32.1 with compressed air provided at the main port 20, up to a maximum of the value of the first pressure p1. In accordance with the functioning of a relay valve, the pressure prevailing as control pressure pS at a control port 94.3 is output as set pressure pE at the second relay valve port 94.2. By measuring this output set pressure pE using a pressure sensor 33', a desired set pressure pE can be set at the control port 94.3 by closed-loop control, that is, in the sense of a closed control loop, by opening and closing of the control valve 92 and of the pressure-maintaining valve 96. In order to increase the control pressure pS—and thus the set pressure pE—the control valve 92 can be opened whilst the pressure-maintaining valve 96 remains closed. To lower the control pressure pS—and thus the set pressure pE—it is correspondingly possible for the pressure-maintaining valve 96 to be opened whilst the control valve 92 is closed, in order to release compressed air from the control line 32.1 in a controlled manner until a desired set pressure pE prevails at the second relay valve port 94.2. When the desired set pressure pE is reached, the pressure-maintaining valve 96 can be closed. The illustrated arrangement of the control valve 92 and of the pressure-maintaining valve 96 advantageously allows a desired control pressure pS to be confined in the control line 32.1 and thus maintained at the control port 94.3 in order to permanently hold a correspondingly output set pressure pE in reserve at the second relay valve port 94.2.

In the refinement shown here, a valve control unit 74' performs the above-described setting of the control pressure pS. For this purpose, the pressure sensor 33' is connected to the valve control unit 74' via a pressure sensor measurement line 33.1. The pressure-maintaining valve 96 is connected to the valve control unit 74' via a pressure-maintaining valve control line 96.1. The control valve 92 is connected to the valve control unit 74' via a control valve control line 92.1. In this way, the valve control unit 74' can correspondingly open and close the control valve 92 and the pressure-maintaining valve 96 on the basis of a pressure measured using the pressure sensor 33', until a desired set pressure pE prevails at the pressure sensor 33' and thus also approximately at the second relay valve port 94.2.

In refinements with a failure brake pressure setting device 80, the valve control unit 74', 74" may advantageously have an operating profile memory unit 878 in which at least one operating profile 880 can be stored. In an operating profile 880, setpoint values for a set pressure pE to be set, which is provided as a failure brake pressure pN in the event of a failure braking operation, may be stored as a function of operating conditions of a specific vehicle. By virtue of an operating profile 880 being selected, in particular by the driver of the vehicle 200, a suitable brake pressure can advantageously be set for actual or expected operating conditions of a specific vehicle by setting of the set pressure, in particular in order to safely decelerate the vehicle 200 in a controlled manner, and without locking, in the event of a failure braking operation.

The valve control unit 74' is furthermore connected—analogously to the refinement shown in FIG. 1—via a vehicle bus line 460 to a vehicle bus 462, in particular a CAN bus, and via a first supply line 414 to a first power supply 416 (not shown here).

The fail-safety valve unit 1' furthermore has a shuttle valve 98 that brings the valve main line 30 and the pilot branch 32 together. For this purpose, part of the pilot branch 32 connects the second relay valve port 94.2 to a first shuttle valve port 98.1. Furthermore, the valve main line 30' connects the main port 20' to a second shuttle valve port 98.2. In the present case, a pressure limiting valve 34 is arranged in the valve main line 30' between the main port 20' and the second shuttle valve port 98.2, via which pressure limiting valve the first pressure p1, which is provided at the main port 20' and thus at a first pressure limiting valve port 34.1, is provided in a settable manner at a settable limiting pressure pB at a second pressure limiting valve port 34.2.

The shuttle valve 98 is configured such that a pneumatic connection to a third shuttle valve port 98.3 is established at that one of the two shuttle valve ports 98.1, 98.2 at which the higher pressure prevails.

The valve main line 30' is connected to the third shuttle valve port 98.3. In this section—downstream of the shuttle valve 98 in a flow direction SR—the valve main line 30' connects the third shuttle valve port 98.3 to the failure brake port 22', wherein the first and second failure brake valves 40, 60 and also a bistable valve unit 70' are also arranged on the valve main line 30'. The bistable valve unit 70' is illustrated in highly simplified form here, and in particular, a bistable valve is not illustrated.

In such a refinement, a set pressure pE can advantageously be set via the failure brake pressure setting device 80, which in the event of a failure braking operation in the event of a multiple fault FM, in particular in the event of a double fault FD, provides this set pressure PE as failure brake pressure pN at the failure brake port 22'. Via the shuttle valve 98, it is furthermore ensured that, out of the set pressure pE prevailing at the first shuttle valve port 98.1 and the limiting pressure pB prevailing at the second shuttle valve port 98.2, always the higher pressure of the two is provided at the third shuttle valve port 98.3 and thus—in the event of a multiple fault FM—at the failure brake port 22'.

Via the shuttle valve 98, it is thus possible, for example via the pressure limiting valve 34, for a minimum value—which is to be provided in every failure braking situation—to be provided as limiting pressure pB, wherein—if it is apparent for example from an operating profile of a specific vehicle that a higher failure brake pressure pN is required or would be desirable—this higher value can be set via the failure brake pressure setting device 80 and provided as set pressure pE at the first shuttle valve port 98.1. Owing to the functioning of the shuttle valve 98 in the "select-high" embodiment shown here, the second shuttle valve port 98.2 can thus be overridden by a higher pressure prevailing at the first shuttle valve port 98.1.

Figure 4:
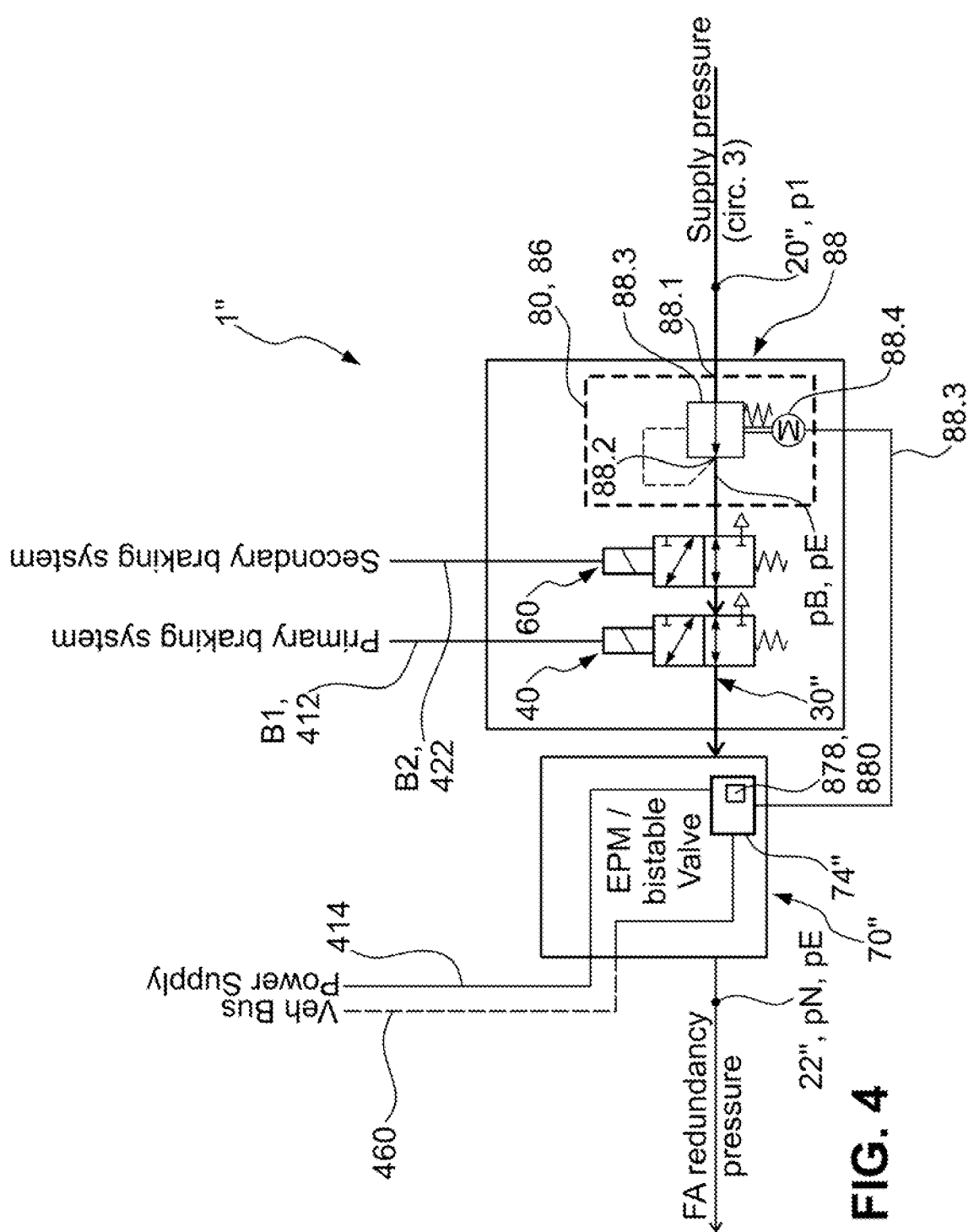

FIG. 4 shows a further refinement of a fail-safety valve unit 1" with a failure brake pressure setting device 80, which is configured as an electrical setting device 86 in the present case. In this case, the failure brake pressure setting device 80 has a motor valve arrangement 88. This is substantially configured as a pressure limiting valve 88.3, in which a first pressure p1 provided at a first motor valve arrangement port 88.1 can be reduced to a limiting pressure pB and provided at a second motor valve arrangement port 88.2. The limiting pressure pB provided at the second motor valve arrangement port 88.2 is settable as required via a motor 88.4, in particular on the basis of an operating profile 880 of a specific vehicle. Thus, the first pressure p1 provided at a main port 20" and thus via a valve main line 30" at the first motor valve arrangement port 88.1 can be set via the motor valve arrangement 88 to the settable limiting pressure pB, which in this case is at the same time the set pressure pE. This set pressure pE is then provided at the failure brake port 22" via the valve main line 30" in the failure braking situation, that is, if both failure brake valves 40, 60 are situated in their open position.

In the present case, the motor valve arrangement 88 is controlled via a valve control unit 74". The valve control unit 74" is connected to the motor valve arrangement 88 via a motor valve control line 88.3. The bistable valve unit 70" is illustrated here in highly simplified form, and in particular, a bistable valve is not illustrated. By virtue of a pressure sensor (not illustrated here) being provided in this embodiment, and analogously to the embodiments shown in FIGS.

1 and 3, the set pressure pE in the valve main line 30" can be measured and correspondingly set by closed-loop control to a setpoint value by actuation of the motor valve arrangement 88.

It is understood that the foregoing description is that of the preferred embodiments of the invention and that various changes and modifications may be made thereto without departing from the spirit and scope of the invention as defined in the appended claims.

LIST OF REFERENCE DESIGNATIONS (PART OF THE DESCRIPTION)

1, 1', 1" Fail-safety valve unit
20, 20', 20" Main port
22, 22', 22" Failure brake port
30, 30', 30" Valve main line
32 Pilot branch
32.1 Control line
33 Pressure sensor
33.1 Pressure sensor measurement line
34 Pressure limiting valve
34.1 First pressure limiter valve port
34.2 Second pressure limiter valve port
40 First monostable failure brake valve
40.1 First valve port of the first failure brake valve
40.2 Second valve port of the first failure brake valve
40.3 Ventilation port of the first failure brake valve
40.4 First magnet part, magnet part of the first failure brake valve
40A Open position of the first failure brake valve, first open position
40B Blocking position of the first failure brake valve, first blocking position
41 First restoring spring, restoring spring of the first failure brake valve
50 Selection valve
52 Shuttle valve
60 Second monostable failure brake valve
60.1 First valve port of the second failure brake valve
60.2 Second valve port of the second failure brake valve
60.3 Ventilation port of the second failure brake valve
60.4 Second magnet part, magnet part of the second failure brake valve
60A Open position of the second failure brake valve, second open position
60B Blocking position of the first failure brake valve, first blocking position
61 Second restoring spring, restoring spring of the second failure brake valve
70 Bistable valve unit
72 Bistable valve
72.1 First bistable valve port
72.2 Second bistable valve port
72.3 Vent of the bistable valve
72A First position of the bistable valve
72B Second position of the bistable valve
74, 74', 74" Valve control unit
80 Failure pressure setting device
82 Pneumatic setting device
84 Relay valve arrangement
86 Electrical setting device
88 Motor valve arrangement
88.1 First motor valve arrangement port
88.2 Second motor valve arrangement port
88.3 Pressure limiting valve of the motor valve arrangement 88.4 Motor of the motor valve arrangement
92 Control valve
92.1 First control valve port
94 Relay valve
94.1 First relay valve port
94.2 Second relay valve port
94.3 Control port
96 Pressure-maintaining valve
98 Shuttle valve
98.1 First shuttle valve port
98.2 Second shuttle valve port
98.3 Third shuttle valve port
200 Vehicle
202 Utility vehicle
204 Braking system, electronically controllable pneumatic braking system
210 Front axle
212 Front wheel
220 Rear axle
222 Rear wheel
410 First control unit
412 First control line
414 First supply line
416 First power supply
418 External control unit
420 Second control unit
422 Second control line
424 Second supply line
426 Second power supply
430 Separate actuation branch
432 Front axle shuttle valve
433 Further front axle shuttle valve
434 Front axle modulator
436 Brake signal transmitter
440 Service brake cylinder
442 Holding brake cylinder
444 Service brake chamber of the holding brake cylinder
446 Holding brake chamber of the holding brake cylinder
448 Supply line
450 Yet further compressed air supply
452 Further compressed air supply
454 Compressed air accumulator
460 Vehicle bus line
461 Further vehicle bus line
462 First vehicle bus
464 Automatic operation control unit
470 Control connection
496 Pneumatic holding brake line
510 Service braking system
512 Pneumatic front axle circuit of the service braking system
514 Pneumatic rear axle circuit of the service braking system
516 Redundancy circuit of the service braking system
520 Holding braking system
522 Pneumatic rear axle circuit of the holding braking system
878 Operating profile memory unit
880 Operating profile
AB Braking demand
AD Diagnostic process
B1 Primary system
B2 First fallback level
BA Failure braking operation
FA Exceptional fault
FD Double fault
FFS Holding brake function FM Multiple fault
FS Electrical failure
FT Diagnostic situation
p1 First pressure
p2 Second pressure
pB Limiting pressure
pE Set pressure
pFS Holding brake pressure
pFS' Pressure derived from the holding brake pressure
pN Failure brake pressure
pS Control pressure
pWV Further supply pressure
S1 First control signal
S2 Second control signal
S3 Third control signal
SR Flow direction

What is claimed is:

1. A fail-safety valve unit for a failure braking function of an electronically controllable pneumatic braking system for a vehicle, wherein the braking system has a first control unit and a second control unit which can at least one of be supplied with power independently of one another and at least partially replace one another in terms of a function, the fail-safety valve unit comprising:

a first failure brake valve configured as a monostable valve;

a second failure brake valve configured as a monostable valve;

a valve main line pneumatically connecting a main port configured to provide a first pressure and a failure brake port;

said first failure brake valve and said second failure brake valve being connected pneumatically in series in said valve main line;

said first failure brake valve being configured to be controllable by the first control unit and said second failure brake valve being configured to be controllable by the second control unit; and, said first failure brake valve and said second failure brake valve being open in an open position when not actuated such that the first pressure prevailing at the main port is provided as a failure brake pressure at the failure brake port such that in at least one of a fault situation, an electrical failure situation, and a diagnostic situation of the control units, a failure braking operation of the vehicle is triggered by way of the provision of the failure brake pressure at the failure brake port via the braking system.

2. The fail-safety valve unit of claim 1, wherein said first failure brake valve and said second failure brake valve are configured as 3/2 directional solenoid valves.

3. The fail-safety valve unit of claim 1 further comprising a bistable valve arranged in said valve main line; and, said bistable valve being configured to switch between a first position, in which said bistable valve blocks said valve main line or connects said valve main line to a vent, and a second position, in which said bistable valve connects said valve main line.

4. The fail-safety valve unit of claim 1 further comprising a pressure sensor arranged downstream of said first failure brake valve and said second failure brake valve as viewed in a flow direction directed from the main port to the failure brake port.

5. The fail-safety valve unit of claim 1 further comprising a pressure limiting valve configured to limit at least one of the first pressure and the failure brake pressure.

6. The fail-safety valve unit of claim 1 further comprising a failure brake pressure setting device configured to controllably set the failure brake pressure.

7. The fail-safety valve unit of claim 6, wherein said failure brake pressure setting device is configured to set the failure brake pressure in a manner dependent upon an operating profile.

8. The fail-safety valve unit of claim 6, wherein said failure brake pressure setting device is configured as a pneumatic setting device.

9. The fail-safety valve unit of claim 6, wherein said failure brake pressure setting device is configured as an electrical setting device.

10. The fail-safety valve unit of claim 6 further comprising a valve control unit configured for setting of the failure brake pressure setting device by at least one of open-loop control and closed-loop control.

11. The fail-safety valve unit of claim 1, wherein the main port is pneumatically connected to a holding brake function for the purposes of receiving an output holding brake pressure, or a pressure derived therefrom, as the first pressure.

12. The fail-safety valve unit of claim 11 further comprising:

a selection valve having a first port pneumatically connected to the holding brake function for the purposes of receiving the first pressure;

a second port pneumatically connected to a compressed air supply for receiving a supply pressure as a second pressure;

a third port pneumatically connected to said first failure brake valve; and, said selection valve being configured to pneumatically connect one of said first port and said second port at which a higher pressure prevails to said third port.

13. The fail-safety valve unit of claim 1, wherein the failure brake pressure is provided as control pressure for an axle modulator; or, the failure brake pressure is provided as brake pressure for a brake cylinder.

14. An electronically controllable pneumatic braking system for a vehicle, the electronically controllable pneumatic braking system comprising:

a first control unit for a primary system;

a second control unit for a first fallback level;

said first control unit and said second control unit can at least one of be supplied with power independently of one another and at least partially replace one another in terms of their function;

a fail-safety valve unit including a first failure brake valve, a second failure brake valve, and a valve main line;

said first failure brake valve being configured as a monostable valve;

said second failure brake valve being configured as a monostable valve;

said valve main line pneumatically connecting a main port configured to provide a first pressure and a failure brake port;

said first failure brake valve and said second failure brake valve being connected pneumatically in series in said valve main line;

said first failure brake valve being configured to be controllable by the first control unit and said second failure brake valve being configured to be controllable by the second control unit;

said first failure brake valve and said second failure brake valve being open in an open position when not actuated such that the first pressure prevailing at the main port is provided as a failure brake pressure at the failure brake port such that in at least one of a fault situation, an electrical failure situation, and a diagnostic situation of the control units, a failure braking operation of the vehicle is triggered by way of the provision of the failure brake pressure at the failure brake port via the braking system;

said fail-safety valve unit being arranged in a separate actuation branch; and, said fail-safety valve unit being pneumatically connectable via the failure brake port to at least one of a service brake cylinder and to a service brake chamber for providing the failure brake pressure for triggering the failure braking operation of the vehicle.

15. The electronically controllable pneumatic braking system of claim 14, wherein said first control unit is connected with actuation capability to said first failure brake valve of said fail-safety valve unit and said second control unit is connected with actuation capability to said second failure brake valve of said fail-safety valve unit.

16. The electronically controllable pneumatic braking system of claim 14 further comprising:

a compressed air accumulator configured to provide the first pressure; wherein the failure brake pressure is provided for an axle modulator; and, said compressed air accumulator being independent of a further compressed air supply assigned to the axle modulator for operation.

17. A vehicle comprising the braking system of claim 14.

18. A method for operating an electronically controllable pneumatic braking system for a vehicle, the electronically controllable pneumatic braking system having a first control unit for a primary system and a second control unit for a first fallback level; the first control unit and the second control unit can at least one of be supplied with power independently of one another and at least partially replace one another in terms of their function; the braking system further having a fail-safety valve unit including a first failure brake valve, a second failure brake valve, and a valve main line; the first failure brake valve being configured as a monostable valve; the second failure brake valve being configured as a monostable valve; the valve main line pneumatically connecting a main port configured to provide a first pressure and a failure brake port; the first failure brake valve and the second failure brake valve being connected pneumatically in series in the valve main line; the first failure brake valve being configured to be controllable by the first control unit and said second failure brake valve being configured to be controllable by the second control unit; the first failure brake valve and the second failure brake valve being open in an open position when not actuated such that the first pressure prevailing at the main port is provided as a failure brake pressure at the failure brake port such that in at least one of a fault situation, an electrical failure situation, and a diagnostic situation of the control units, a failure braking operation of the vehicle is triggered by way of the provision of the failure brake pressure at the failure brake port via the braking system; the fail-safety valve unit being arranged in a separate actuation branch; and, the fail-safety valve unit being pneumatically connectable via the failure brake port to at least one of a service brake cylinder and to a service brake chamber for providing the failure brake pressure for triggering the failure braking operation of the vehicle; the method comprising:

holding the first pressure in reserve in the fail-safety valve unit;

wherein the first pressure is held back by actuation of the first failure brake valve and the second failure brake valve; and, in the event of a multiple fault or in the diagnostic situation, the first pressure is, as a result of an interruption of the actuation of the failure brake valves, provided as the failure brake pressure to at least one brake cylinder of the braking system for triggering the failure braking operation.

19. The method of claim 18, wherein the interruption of the actuation occurs as a result of a deenergization of the at least one first and second failure brake valve.

20. The method of claim 18, wherein the failure brake pressure is set in a manner dependent on an operating profile.

21. The method of claim 18, wherein the failure brake pressure is a holding brake pressure output by a holding brake function for the purposes of pressurizing holding brake cylinders or is a pressure derived therefrom.

22. The method of claim 18 further comprising:

carrying out a diagnostic process including ascertaining the failure brake pressure at the failure brake port via a pressure sensor, wherein, before the interruption of the provision of the signal, an outputting of pressure in a service braking system is demanded.

23. The method of claim 22, wherein:

the diagnostic process is carried out during a service braking operation of the service braking system; or, the diagnostic process is carried out while the vehicle is stationary, wherein a braking demand is generated by at least one of an external control unit and an automatic operation control unit.

24. The method of claim 23, wherein:

the braking demand is provided by at least one of a brake signal transmitter, the external control unit, the automatic operation control unit, wherein at least one of the braking demand is provided via a vehicle data bus and the braking demand is in the form of a CAN signal.

25. The method of claim 22 further comprising:

providing a signal for an individual one of said first failure brake valve and said second failure brake valve; and, ascertaining the failure brake pressure.

* * * * *